US012495309B2

(12) United States Patent
Mathur et al.

(10) Patent No.: US 12,495,309 B2
(45) Date of Patent: Dec. 9, 2025

(54) POLE MANAGEMENT FOR INSTALLATION OF NETWORK ELEMENTS BASED ON LATITUDE AND LONGITUDE

(71) Applicant: RAKUTEN SYMPHONY, INC., Tokyo (JP)

(72) Inventors: Harsh Mathur, Indore (IN); Diksha Dubey, Indore (IN); Anmol Choudhary, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/042,770

(22) PCT Filed: Jul. 25, 2022

(86) PCT No.: PCT/US2022/038125
§ 371 (c)(1),
(2) Date: Feb. 24, 2023

(87) PCT Pub. No.: WO2024/025508
PCT Pub. Date: Feb. 1, 2024

(65) Prior Publication Data
US 2024/0276234 A1    Aug. 15, 2024

(51) Int. Cl.
*H04L 12/28* (2006.01)
*H04W 16/18* (2009.01)

(52) U.S. Cl.
CPC ............ *H04W 16/18* (2013.01); *H04L 12/28* (2013.01)

(58) Field of Classification Search
CPC ...... H04W 16/18; H04W 24/02; H04W 4/021
See application file for complete search history.

(56) References Cited

U.S. PATENT DOCUMENTS

| | | | |
|---|---|---|---|
| 8,929,931 B1* | 1/2015 | Goldberg | H04W 16/20 455/448 |
| 10,924,158 B2 | 2/2021 | Bogdan et al. | |
| 2008/0180322 A1 | 7/2008 | Islam et al. | |
| 2014/0051451 A1* | 2/2014 | Goldberg | H04W 16/24 455/446 |
| 2020/0202107 A1* | 6/2020 | Ozkucur | G06F 18/22 |
| 2020/0221314 A1 | 7/2020 | Cho et al. | |
| 2021/0065138 A1* | 3/2021 | Coleman | G06Q 10/20 |
| 2021/0168623 A1* | 6/2021 | Gupta | H04W 24/02 |
| 2022/0070683 A1* | 3/2022 | Tsuboi | H04B 17/3912 |
| 2023/0292139 A1* | 9/2023 | Srivastava | H04W 72/56 |

FOREIGN PATENT DOCUMENTS

EP        2747465 A1    6/2014

* cited by examiner

*Primary Examiner* — Abdelnabi O Musa
(74) *Attorney, Agent, or Firm* — HAUPTMAN HAM, LLP

(57) ABSTRACT

Pole management is described for installation of network elements based on latitude and longitude values. Pole data having latitude and longitude values is obtained from a plurality of sources. The pole data from the plurality of sources is stored in a central pole database. Poles associated with at least a portion of the pole data is presented on a map in a graphical user interface based at least on the latitude and longitude values. A first pole is selected on the map for consideration for installing a network element for providing wireless services. A geographic boundary is presented on the map relative to the first pole, the geographic boundary encompassing candidate poles. A pole is selected from the candidate poles within the geographic boundary to install the network element to provide the wireless services.

20 Claims, 10 Drawing Sheets

Unstructured Pole Data

| Company Name | Branch Code | Mark No. | Pole No. | Pole Type | Mark Name | Diagram No. | Area | Pref (Jp) | Pref (Eng) | City (Jp) | City (Eng) | City Code | Latitude | Longitude |
|---|---|---|---|---|---|---|---|---|---|---|---|---|---|---|
| 中国電力 | 5100 | 5330F04 | 000 0012 | - | 広島市役所線 | - | - | | Hiroshima | 広島市中区 | Hiroshima | 34101 | 34.38441 | 132.4561 |
| 中国電力 | 5100 | 5330W70 | 005 0001 | - | 三菱重工江波線 | - | - | 広島県 | Hiroshima | 広島市中区 | Hiroshima | 34101 | 34.37189 | 132.4358 |
| 中国電力 | 5100 | 5330W70 | 006 0001 | - | 三菱重工江波線 | - | - | 広島県 | Hiroshima | 広島市中区 | Hiroshima | 34101 | 34.37169 | 134.4357 |
| 中国電力 | 5100 | 5330W70 | 007 0001 | - | 三菱重工江波線 | - | - | 広島県 | Hiroshima | 広島市中区 | Hiroshima | 34101 | 34.37141 | 134.4355 |
| 中国電力 | 5100 | 5330W70 | 009 0001 | - | 三菱重工江波線 | - | - | 広島県 | Hiroshima | 広島市中区 | Hiroshima | 34101 | 34.37078 | 134.4352 |

FIG. 2

Structured Data

| Diagram No. | Area | Pref (Jp) | Pref (Eng) | City (Jp) | City (Eng) | City Code | Latitude | Longitude |
|---|---|---|---|---|---|---|---|---|
| - | - | 広島県 | Hiroshima | 広島市中区 | Hiroshima | 34101 | 34.38441 | 132.4561 |
| - | - | 広島県 | Hiroshima | 広島市中区 | Hiroshima | 34101 | 34.37189 | 132.4358 |
| - | - | 広島県 | Hiroshima | 広島市中区 | Hiroshima | 34101 | 34.37169 | 134.4357 |
| - | - | 広島県 | Hiroshima | 広島市中区 | Hiroshima | 34101 | 34.37141 | 134.4355 |
| - | - | 広島県 | Hiroshima | 広島市中区 | Hiroshima | 34101 | 34.37078 | 134.4352 |

FIG. 3

```
700 ─┐
         ┌─────────────────────────────────────┐
         │  {         ┌─710                    │
         │    "NELatlong": [                   │
         │      {                              │
         │        "lat":35.16967761850738,◄──┐ │
         │        "lng":136.93458616733554◄─┐ 712
         │      }                           714│
         │    ],                               │
         │                                     │
  740 ──►│  "SWLatlong": [                     │
         │      {                              │
         │        "lat":35.168243664202535,◄──┐│
         │        "lng":136.92603528499606◄─┐ 742
         │      }                           744│
         │    ],                               │
         │    "filterType":"actualSite"        │
         │  }                                  │
         └─────────────────────────────────────┘
```

```
{
"modifiedTime":null,
"createdTime":null,
"creator":null,
"creatorId":null,
"lastModifier":null,
"lastModifierId":null,
```
810 → `"id":3391818,`
```
"category":null,
"isSelected":null,
```
814 → `"poleUniqueId":"129_00ｳ993_35.1698278921275_136.928326566405",`
```
"number":null,
```
818 → `"branchcode":"129",`
```
"areaNumber":null,
"areaName":null,
```
822 → `"poleNumber":"00ｳ993",`
```
"drawingNumber":null,
"section":null,
"xCoordinate":-21438.103,
"yCoordinate":-92421.985,
"latitude":null,
"longitude":null,
"latitudeTokyo":null,
"longitudeTokyo":null,
```
826 → `"latitudeWGS84":35.1698278921275,`
830 → `"longitudeWGS84":136.928326566405,`
834 → `"geographyL1":"TOKAI",`
838 → `"geographyL2":"Aichi",`
```
"geographyL3":"NAGOYA-SHI",
```
842 → `"poleRegionId":48,`
846 → `"polePrefectureId":2106,`
850 → `"poleCityId":944,`
```
"geographyL4":"AIC-HIGASHI-SHINSAKA",
"poleClusterId":381,
"branchName":null,
"distanceFromNominalSite":null,
```
854 → `"companyName":"中部電力",`
```
"poleNoSecond":null,
"company Category":null,
"selected":null
}
```

FIG. 8

POLE MANAGEMENT FOR INSTALLATION OF NETWORK ELEMENTS BASED ON LATITUDE AND LONGITUDE

RELATED APPLICATIONS

The present application is a National Phase of International Application No. PCT/US2022/038125, filed Jul. 25, 2022.

TECHNICAL FIELD

This description relates to pole management for installation of network elements based on latitude and longitude, and method of using the same.

BACKGROUND

A mobile telecommunications network provides wireless connectivity to mobile devices. These devices, which are known as User Equipment (UE), have traditionally corresponded to smartphones and tablets, but will increasingly include cars, drones, industrial and agricultural machines, robots, home appliances, medical devices, etc. The mobile telecommunications network includes two main subsystems: the Radio Access Network (RAN) and the Mobile Core. The RAN manages the radio spectrum to ensure efficient use and that quality-of-service provisions of users are met. The network corresponds to a distributed collection of base stations. In 4G, these are referred to as eNodeB (or eNB), which is short for evolved Node B. In 5G, the base stations are referred to as gNB, where "g" stands for next generation.

In a mobile telecommunications network, as technology evolves, there are different generations of network elements (NEs) operating simultaneously. Multiple deployment options often coexist. For example, there are standalone (SA) 4G and SA 5G sites. Another option is non-standalone (NSA) deployments where there are 4G and 5G RANs that access a 4G Evolved Packet Core (EPC). Another possibility involves NSA 4G and 5G RANs that access a 5G Mobile Core, which is referred to as an NG-Core. Thus, there are different generations of technology that use different equipment to support mobile communications.

While 4G networks use large cellular towers to mount NEs to create cell sites, 5G uses a type of technology called "small-cell" base stations. These base stations are discreet and NEs are installed on existing pieces of infrastructure allowing more dense coverage. Utility poles often accommodate the equipment that is used to provide a variety of services, including electric power, telephone, cable, wireline broadband, and wireless. For example, utility poles are rented out for different purposes and one of the purposes is to install various NEs that handle mobile signals between the NEs and mobile users. NEs include the base stations and antennas. However, there does not exist a solution to obtain pole data to determine how many poles exist and where such poles are located on a map so that network designers are able to identify poles for installation of NEs.

SUMMARY

In at least embodiment, a method for providing pole management for installation of network elements includes obtaining pole data having latitude and longitude values from a plurality of sources, storing the pole data from the plurality of sources in a central pole database, presenting, on a map in a graphical user interface, poles associated with at least a portion of the pole data based at least on the latitude and longitude values, determining a first pole on the map for consideration for installing a network element for providing wireless services, presenting a geographic boundary on the map relative to the first pole, the geographic boundary encompassing candidate poles, and selecting, from the candidate poles within the geographic boundary, a pole to install the network element to provide the wireless services.

In at least one embodiment, a device for providing pole management for installation of network elements includes a memory storing computer-readable instructions, and a processor connected to the memory, wherein the processor is configured to execute the computer-readable instructions to obtain pole data having latitude and longitude values from a plurality of sources, store the pole data from the plurality of sources in a central pole database, present, on a map in a graphical user interface, poles associated with at least a portion of the pole data based at least on the latitude and longitude values, determine a first pole on the map for consideration for installing a network element for providing wireless services, present a geographic boundary on the map relative to the first pole, the geographic boundary encompassing candidate poles, and select, from the candidate poles within the geographic boundary, a pole to install the network element to provide the wireless services.

In at least one embodiment, a non-transitory computer-readable media having computer-readable instructions stored thereon, which when executed by a processor causes the processor to obtain pole data having latitude and longitude values from a plurality of sources, store the pole data from the plurality of sources in a central pole database, present, on a map in a graphical user interface, poles associated with at least a portion of the pole data based at least on the latitude and longitude values, determine a first pole on the map for consideration for installing a network element for providing wireless services, present a geographic boundary on the map relative to the first pole, the geographic boundary encompassing candidate poles, and select, from the candidate poles within the geographic boundary, a pole to install the network element to provide the wireless services.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

FIG. 2 is an example of unstructured pole data from a utility company according to at least one embodiment.

FIG. 3 is an example of structured pole data according to at least one embodiment.

FIG. 7 shows pole get code for requesting pole data according to at least one embodiment.

FIG. 8 shows a response 00 to the pole data request according to at least one embodiment.

DETAILED DESCRIPTION

Figure 1:
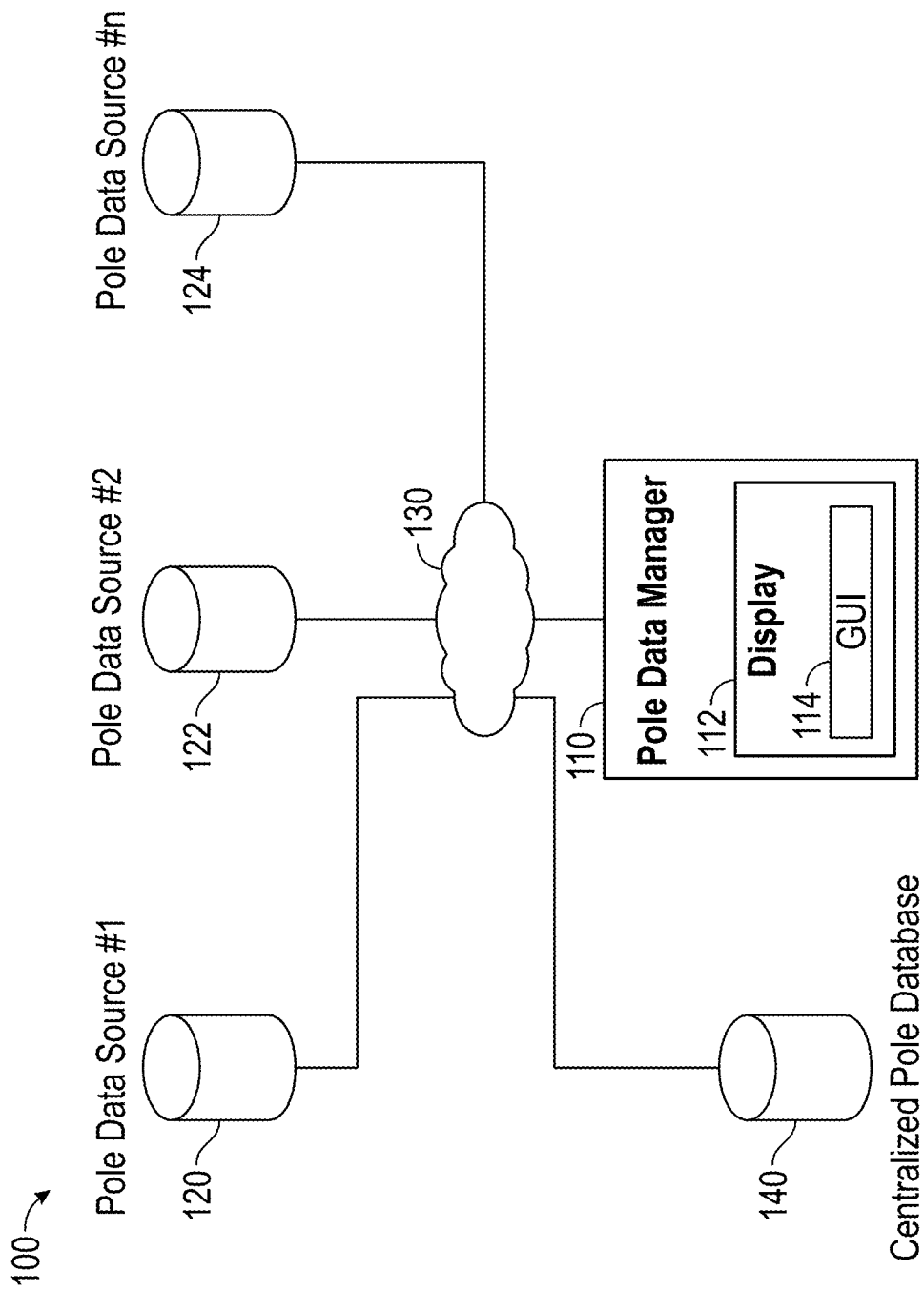
FIG. 1 is a diagram of a system for gathering data according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, or a data-stream or a signaling-stream. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, or a data-stream or signaling-stream from UE.

Embodiments described herein provide pole management for installation of network elements based on latitude and longitude having one or more advantages. For example, a pole data manager provides a graphical user interface (GUI) that helps developers and end-users fetch data of pole sites using longitude and latitude. Site location is viewed on a map according to latitude and longitude. The pole data manager is used for integration purposes for creating candidate sites for installing network elements (NEs) that provide mobile telecommunication services. The pole data manager provides an interface to pole data from different sources thereby saving development time and providing more flexibility to developers.

FIG. 1 is a diagram of a system 100 for gathering data according to at least one embodiment.

In FIG. 1, the system 100 includes a plurality of pole data sources 120, 122, 124. In at least one embodiment, the plurality of pole data sources 120, 122, 124 are different utility companies, such as electoral utility companies. Many utility companies 120, 122, 124 exist and are located in different areas to provide services of the different companies.

Data is provided by the different utility companies 120, 122, 124 in different formats and is collected by the pole data manager 110 via cloud 130. The pole data manager 110 incudes a display 112 that presents a graphical user interface (GUI) 114 to view the collected pole data. The pole data collected from the different utility companies 120, 122, 124 is collected as unstructured data and standardized. For example, in at least one embodiment, common parameters from the pole data from the utility companies 120, 122, 124 are selected for use in determining a location to use for installing NEs. The parameters selected for use from the different utility companies 120, 122, 124 are identified, the pole data from the different utility companies 120, 122, 124 is merged and integrated into a central pole database 140. The central pole database 140 includes the latitude and longitude of the poles from the different utility companies 120, 122, 124.

FIG. 2 is an example of unstructured pole data 200 from a utility company according to at least one embodiment.

In FIG. 2, the unstructured pole data 200 includes various fields including the company name 210, pole number 212, prefecture 214, city 216, latitude of poles 218, and longitude of poles 220. The unstructured pole data 200 shown in FIG. 2 includes additional data, such as branch code 222, city code 224, etc. Pole data from different utility companies includes different data under different fields and may have a greater or less number of fields than the unstructured pole data 200 shown in FIG. 2. Pole data is dependent upon utility companies such as NTT, KEPCO, HEPCO, etc. The different utility companies have different pole data that are categorized under different headers. However, to be able to map the poles the unstructured pole data 200 includes at least the latitude of poles 218, and the longitude of poles 220.

FIG. 3 is an example of structured pole data 300 according to at least one embodiment.

In FIG. 3, some fields in the pole data have been eliminated so that the structured pole data 300 has the same or common headers for pole data from each of the utility companies. The structured pole data 300 includes the latitude of poles 318 and the longitude of poles 320. By providing pole data from the utility companies with common headers allows the structured pole data 300 to be analyzed and enables the poles to be identified based on the name of the utility company. The structured pole data 300 of one utility company is also capable of being merged with the pole data of another utility company.

Figure 4:
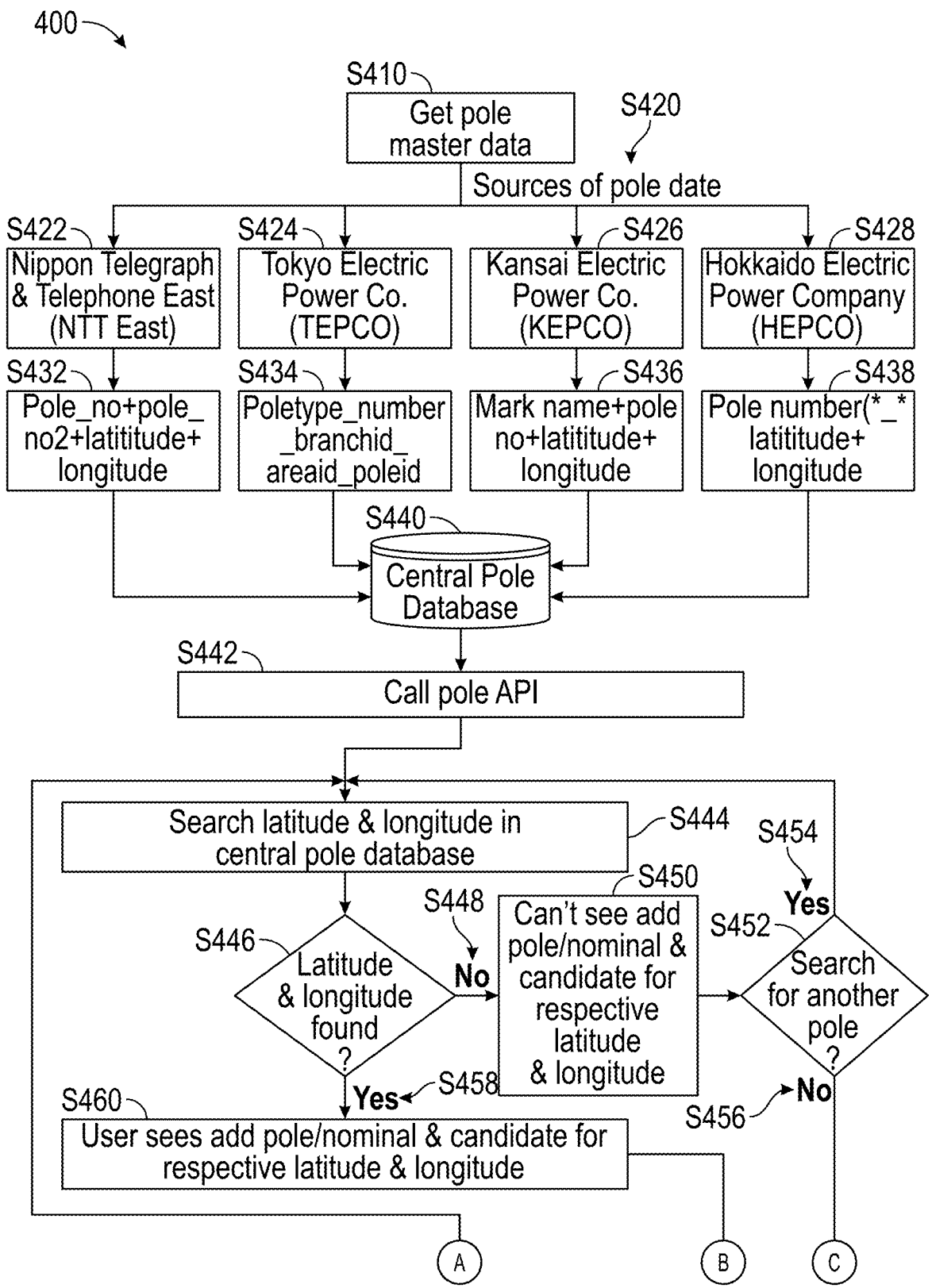
FIG. 4 is a flowchart of a method for selecting poles for installing network elements (NEs) according to at least one embodiment.
Figure 4:
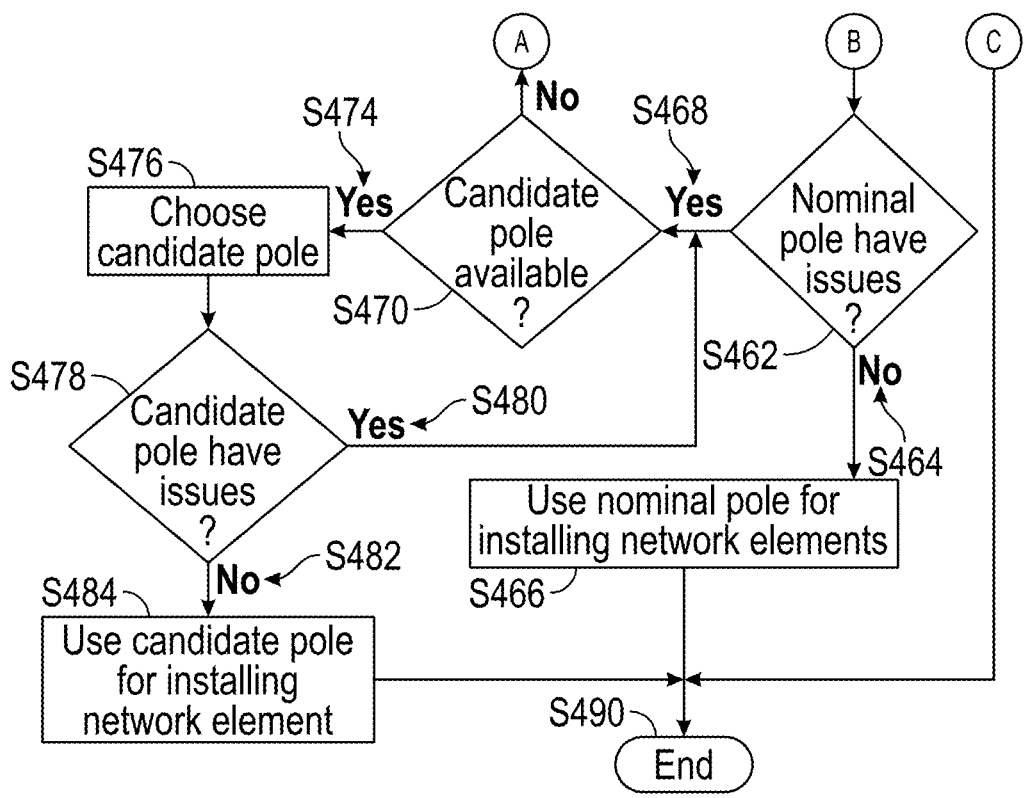

FIG. 4 is a flowchart 400 of a method for selecting poles for installing network elements (NEs) according to at least one embodiment.

In FIG. 4, the method begins by fetching pole data from a plurality of sources S410, e.g., utility companies. FIG. 4 shows that the sources of pole data S420 includes Nippon Telegraph and Telephone Easter (NTT East) S422, Tokyo Electric Power Co. (TEPCO) S424, Kansai Electric Power Co. (KEPCO) S426, and Hokkaido Electric Power Company (HEPCO) S428. Embodiments are not limited to these utility companies, and in different embodiments include a greater number or a fewer number of companies.

FIG. 4 shows that the pole data from the utility companies S422, S424, S426, S428 include pole data in different formats. The pole data obtained from NTT East S422 includes pole numbers, latitude, and longitude S432. The pole data obtained from TEPCO S424 includes pole type, pole number, Branch ID, Area ID, and pole ID S434. The pole data obtained from KEPCO S426 includes mark name, pole number, latitude, and longitude S436. The pole data obtained from HEPCO S428 includes pole number, latitude, and longitude S438. The pole data is structured and merged into a central pole database S440. As new sources of pole data becomes available, new pole data is obtained, processed, and entered into the central pole database S440.

An API is called for analyzing the pole data in the central pole database S442. The user searches the central pole database by latitude and longitude S444. A determination is made whether the latitude and longitude is found in the central pole database S446. In response to the latitude and longitude not being found in the central pole database S448, then candidate poles are not available and the user cannot see the poles for selecting a nominal and candidate pole for the longitude and latitude S450. A decision is made whether to search for another pole by latitude and longitude S452 In response to deciding to search for another pole by latitude and longitude S454, then a new latitude and longitude for a pole is selected for conducting the search in the central pole database S444. In response to deciding not to search for another pole by latitude and longitude S456, then the process terminates S490.

In response to the latitude and longitude being found in the central pole database S458, the user see the poles for selecting a nominal and candidate pole for the longitude and latitude S460. Based on seeing poles for selecting a nominal and candidate pole for the longitude and latitude S460, a determination is made whether the nominal pole has issues or characteristics that are detrimental or unconducive for providing wireless services S462. A pole having issues involves one or more of a correct location of the candidate pole not being provided, a pole being located between two buildings, too much interference existing for the pole, or the location of the pole not being otherwise acceptable. In response to the nominal pole not having issues S464, the nominal pole is used for installing network elements S466. Then, the process terminates S490.

In response to the nominal pole having issues S468, a determination is made whether candidate poles are available for consideration within a predetermined radius of the nominal pole S470. If no candidate poles are available for consideration within the predetermined radius of the nominal pole S472, the user selects a new latitude and longitude for a pole for conducting the search in the central pole database S444.

In response to candidate poles being available for consideration within the predetermined radius of the nominal pole S474, a candidate pole is chosen S476. A determination is made whether the chosen candidate pole has issues S478. In response to the chosen candidate pole having issues S480, the process returns to determine whether candidate poles are available for consideration within the predetermined radius of the nominal pole S470. In response to the chosen candidate pole not having issues S482, the chosen candidate pole is used for installing network elements S484. Then, the process terminates S490. Finding the latitude and longitude in the central pole database is very likely because there are many poles provided to the central pole database from the different utility companies.

Figure 5:
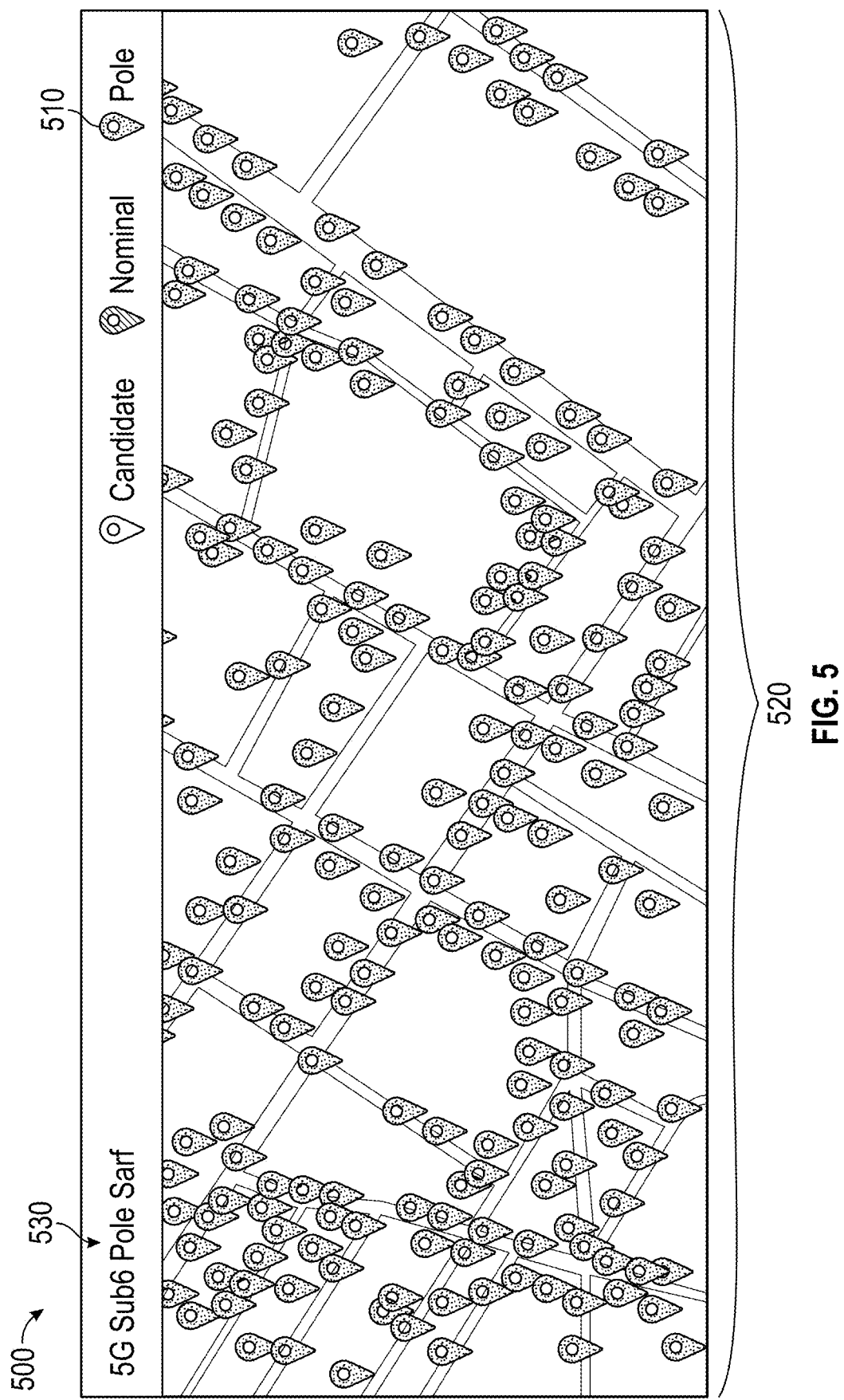
FIG. 5 shows a pole map graphical user interface (GUI) showing locations of poles based on pole data in the central pole database according to at least one embodiment.

FIG. 5 shows a pole map graphical user interface (GUI) 500 showing locations of poles based on pole data in the central pole database according to at least one embodiment.

In FIG. 5, pole markers 510 are shown plotted on pole map GUI 500 based on latitude and longitude values of the poles in the central pole database. As described above, the pole data in the central pole database that is used for the mapped poles 520 is obtained from numerous sources, e.g., utility companies. The pole data is structured in a common form, and integrated into a central pole database. As shown in FIG. 5, the mapping of poles 520 in pole map GUI 500 are associated with a 5G Pole Site Acquisition Request Form (SARF) 530.

In the process of deciding on a pole to install NE, a pole from the mapped poles 520 is selected and analyzed. In response to selection from the mapped poles 520 of a marker associated with a pole as a nominal candidate, the longitude and the latitude is displayed. For example, from the mapped poles 520, a user selects a pole on the pole map GUI 500. In at least one embodiment, the map is Google map. In at least one embodiment, maps other than Google map are used.

Figure 6:
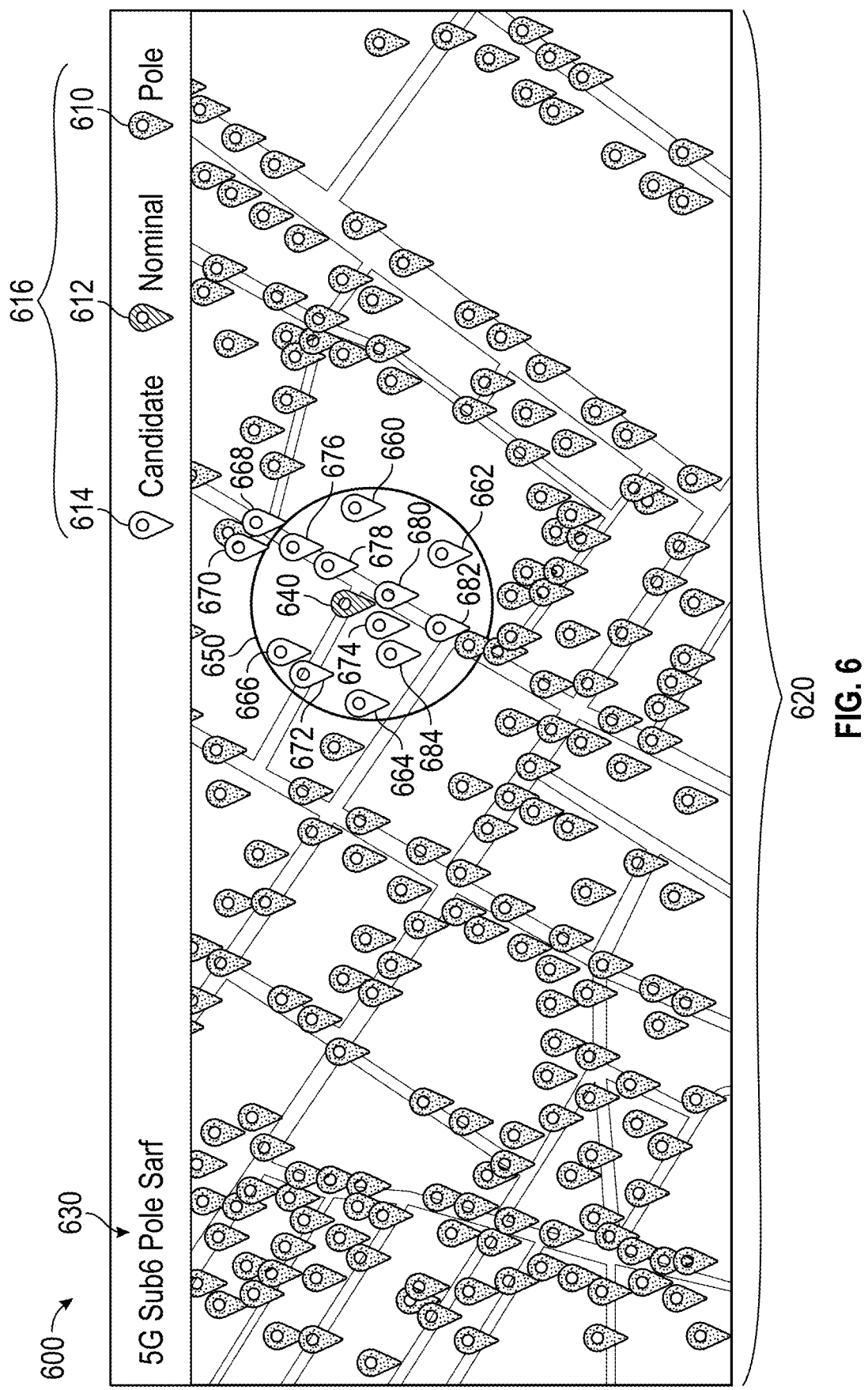
FIG. 6 shows a pole map GUI showing a nominal pole selected for installing NE to establish a cell site according to at least one embodiment.

FIG. 6 shows a pole map GUI 600 showing a nominal pole selected for installing NE to establish a cell site according to at least one embodiment.

In FIG. 6, markers of poles 610, markers of nominal poles 612, and markers of candidate poles 614 are shown at the top key 616. The pole map GUI 600 is capable of being accessed and used anywhere. Pole map GUI 600 shows mapped poles 620. The mapped poles 620 in pole map GUI 600 are associated with a 5G Pole Site Acquisition Request Form (SARF) 630.

In FIG. 6, from the mapped poles 620, a pole has been selected as a nominal pole 640. A circle 650 having a predetermined radius that is based on the technology of the NE (e.g., whether the site will be 4G, 5G, etc.) is added. NE includes antennas, transmitter, etc. The circle 650 represents a predetermined area covered by NEs installed on the selected nominal pole 640. In FIG. 6, circle 650 has a radius based on the site being for a 5G site. Coverage area of 5G sites is smaller than the coverage area of 4G sites because signals from 5G sites radiate a smaller distance. Signals from 4G sites travel greater distances and circle 650 will be larger. The radius of circle 650 is determined by logic executed by a processor to present the pole map GUI 600 based on the technology. For example, in at least one embodiment, the radius of the circle 640 is 250 meters.

The pole map GUI 600 enables a nominal pole 640 to be chosen, and if the nominal pole 640 is not acceptable, candidate poles candidate poles 660, 662, 664, 666, 668, 670, 672, 674, 676, 678, 680, 682, 684 within circle 650 are considered. The nominal pole 640 is selected according to a latitude and longitude. A circle 650 of a predetermined radius is centered about the nominal pole 640. Around the nominal pole 640 and within circle 650, candidate poles 660, 662, 664, 666, 668, 670, 672, 674, 676, 678, 680, 682, 684 are displayed. In at least one embodiment, candidate poles 660, 662, 664, 666, 668, 670, 672, 674, 676, 678, 680, 682, 684 are owned by the same utility company as the nominal pole or are owned by different utility companies. In at least one embodiment, each of the candidate poles 660, 662, 664, 666, 668, 670, 672, 674, 676, 678, 680, 682, 684 are owned by different utility companies.

The pole map GUI 600 shows the mapped poles 620 from pole data provided by each of the utility companies. Previously, a view of poles 620 from different utility companies was not available. In response to the nominal pole 640 being identified as having issues that are not favorable for installation of the NE, a pole for consideration is selected from candidate poles 660, 662, 664, 666, 668, 670, 672, 674, 676, 678, 680, 682, 684 within circle 650. For example, pole 680 is selected because nominal pole 640 has issues that are not favorable for installation of the NE. In at least one embodiment, a pole having issues involves one or more of a correct location of the candidate pole not being provided, a pole being located between two buildings, too much interference existing for the pole, or the location of the pole not being otherwise acceptable.

In response to choosing candidate pole 680 for consideration, a manual survey of candidate pole 680 is performed. For example, pictures are uploaded and the characteristics of candidate pole 680 are inspected, or a checklist is completed for filtering candidate poles.

In response to the candidate pole 680 not being suitable, a new candidate pole is chosen from candidate poles 660, 662, 664, 666, 668, 670, 672, 674, 676, 678, 682, 684. The process is repeated until a candidate pole is choose that is acceptable. In response to candidate pole 680 being determined to be acceptable, candidate pole 680 is finalized for use in installing NEs. In response to the candidate pole 680 not being suitable, a new candidate pole is chosen from candidate poles 660, 662, 664, 666, 668, 670, 672, 674, 676, 678, 682, 684 within circle 650. The process is repeated until a candidate pole is choose that is acceptable. In response to there not being any acceptable poles, i.e., there are no other candidate poles, then that location is dropped from consideration. In FIG. 6, the nominal pole 640 is along a road, so there are many candidate poles also. Thus, having poles that are not acceptable will be very rare.

At least one embodiment of the method for providing pole management for installation of network elements includes obtaining pole data having latitude and longitude values from a plurality of sources, storing the pole data from the plurality of sources in a central pole database, presenting, on a map in a graphical user interface, poles associated with at least a portion of the pole data based at least on the latitude and longitude values, determining a first pole on the map for consideration for installing a network element for providing wireless services, presenting a geographic boundary on the map relative to the first pole, the geographic boundary encompassing candidate poles, and selecting, from the candidate poles within the geographic boundary, a pole to install the network element to provide the wireless services.

In at least one embodiment a pole data manager provides a graphical user interface (GUI) that helps developers and end-users fetch data of pole sites using longitude and latitude. Site location is viewed on a map according to latitude and longitude. The pole data manager is used for integration purposes for creating candidate sites for installing network elements (NEs) that provide mobile telecommunication services. The pole data manager provides an interface to pole data from different sources thereby saving development time and providing more flexibility to developers.

FIG. 7 shows pole get code 700 for requesting pole data according to at least one embodiment.

In FIG. 7, pole data is associated within a boundary defined by "NElatlong" 710 and "SWlatlong" 740. The northeast latitude is 35.16967761850738 712 and northeast longitude is 136.93458616733554 714. The southwest latitude is 35.168243664202535 742 and the southwest longitude is 136.92603528499606 744.

FIG. 8 shows a response 800 to the pole data request according to at least one embodiment.

In FIG. 8, the response provides the latitude and longitude of a pole within the boundary coordinates provide by the pole get code 700 of FIG. 7. For example, the pole would be within the circle 650 as shown in FIG. 6. Response 800 includes, for example, "id":3391818 810, "poleUniqueId": "129_00 814, "branchcode": "129" 818, "poleNumber":"00 ウ 993" 822, latitude 35.1698278921275 826, longitude 136.928326566405 830, city "TOKAI" 834, prefecture "Aichi" 838, "poleRegionId":48 842, "pole PrefectureId": 2106 846, "poleCityId":944 850, and "companyName":"中部電力" 854.

In at least one embodiment, additional data is provided including, for example, "xCoordinate":−21438.103, and "yCoordinate":−92421.985. The pole data is able to be used to identify the source of the pole data (e.g., what company a pole belongs to), and which poles are located within the defined boundary (as shown in FIG. 6, the boundary is shown as circle 650). Once a pole is located in the central pole database, the GUI draws a circle of a radius based on the technology. Within the radius, available candidate poles from the central pole database are displayed within the circle.

Figure 9:
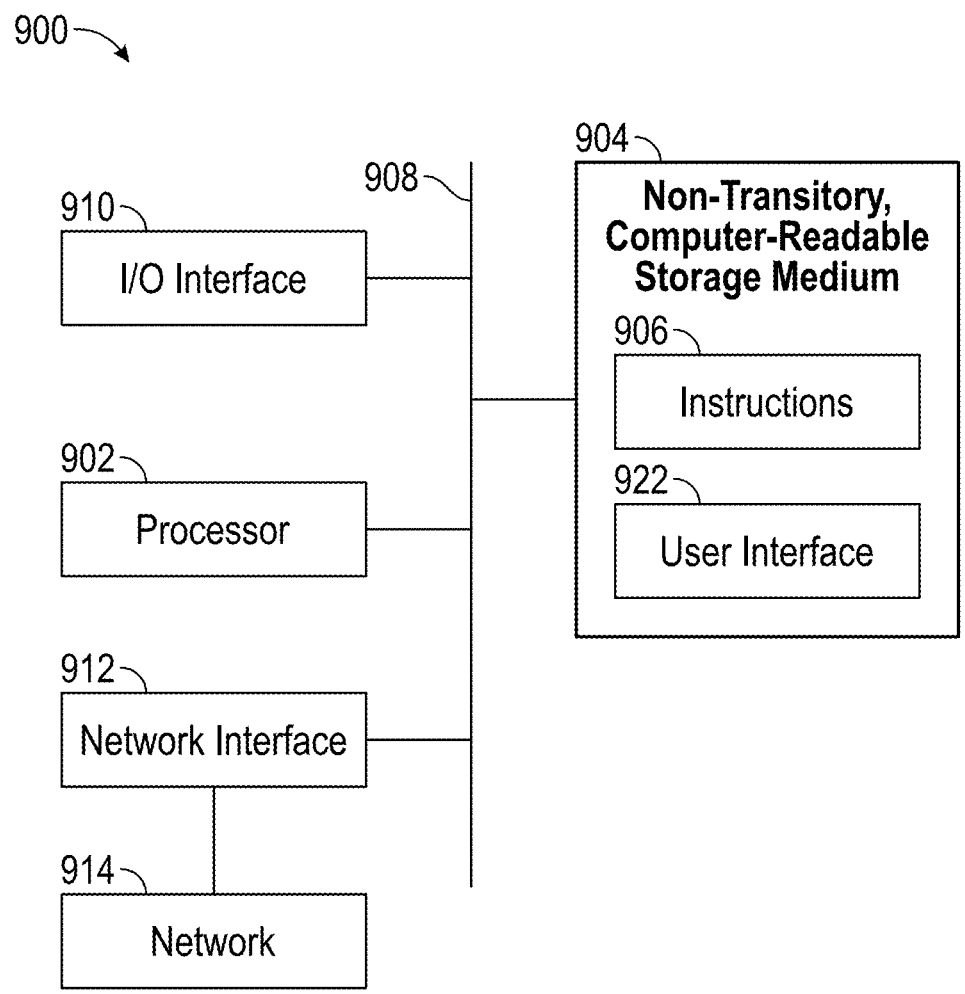
FIG. 9 is a high-level functional block diagram of a processor-based system according to at least one embodiment.

FIG. 9 is a high-level functional block diagram of a processor-based system 900 according to at least one embodiment.

In at least one embodiment, processing circuitry 900 provides pole data manager for selecting poles for installing network elements according to at least one embodiment. Processing circuitry 900 implements pole data manager for selecting poles for installing network elements according to at least one embodiment using processor 902. Processing circuitry 500 also includes a non-transitory, computer-readable storage medium 904 that is used to implement pole data manager for selecting poles for installing network elements according to at least one embodiment. Storage medium 904, amongst other things, is encoded with, i.e., stores, instructions 906, i.e., computer program code that are executed by processor 902 causes processor 902 to provide pole data manager for selecting poles for installing network elements according to at least one embodiment. Execution of instructions 906 by processor 902 represents (at least in part) a network visualization application which implements at least a portion of the methods described herein in accordance with one or more embodiments (hereinafter, the noted processes and/or methods).

Processor 902 is electrically coupled to computer-readable storage medium 904 via a bus 908. Processor 902 is electrically coupled to an Input/output (I/O) interface 910 by bus 908. A network interface 912 is also electrically connected to processor 902 via bus 908. Network interface 912 is connected to a network 914, so that processor 902 and computer-readable storage medium 904 connect to external elements via network 914. Processor 902 is configured to execute instructions 906 encoded in computer-readable storage medium 904 to cause processing circuitry 900 to be usable for performing at least a portion of the processes and/or methods. In one or more embodiments, processor 902 is a Central Processing Unit (CPU), a multi-processor, a distributed processing system, an Application Specific Integrated Circuit (ASIC), and/or a suitable processing unit.

Processing circuitry 900 includes I/O interface 910. I/O interface 910 is coupled to external circuitry. In one or more embodiments, I/O interface 910 includes a keyboard, keypad, mouse, trackball, trackpad, touchscreen, and/or cursor direction keys for communicating information and commands to processor 902.

Processing circuitry 900 also includes network interface 912 coupled to processor 902. Network interface 912 allows processing circuitry 900 to communicate with network 914, to which one or more other computer systems are connected. Network interface 912 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 900 is configured to receive information through I/O interface 910. The information received through I/O interface 910 includes one or more of instructions, data, design rules, libraries of cells, and/or other parameters for processing by processor 902. The information is transferred to processor 902 via bus 908. Processing circuitry 900 is configured to receive information related to a User Interface (UI) through I/O interface 910. The information is stored in computer-readable medium 904 as UI 922.

In one or more embodiments, one or more non-transitory computer-readable storage media 904 having stored thereon instructions (in compressed or uncompressed form) that may be used to program a computer, processor, or other electronic device) to perform processes or methods described herein. The one or more non-transitory computer-readable storage media 904 include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more non-transitory computer-readable storage media 904 includes a Compact Disk-Read Only Memory (CD-ROM), a Compact Disk-Read/Write (CD-R/W), and/or a Digital Video Disc (DVD).

In one or more embodiments, storage medium 904 stores computer program code 906 configured to cause processing circuitry 900 to perform at least a portion of the processes and/or methods for selecting poles on a map according to longitude and latitude for installing network elements according to at least one embodiment. In one or more embodiments, storage medium 904 also stores information, such as algorithm which facilitates performing at least a portion of the processes and/or methods for selecting poles on a map according to longitude and latitude for installing network elements according to at least one embodiment. Accordingly, in at least one embodiment, the processor circuitry 900 performs a method for selecting poles on a map according to longitude and latitude for installing network elements according to at least one embodiment. The process of obtaining pole data having latitude and longitude values from a plurality of sources, storing the pole data from the plurality of sources in a central pole database, presenting, on a map in a graphical user interface, poles associated with at least a portion of the pole data based at least on the latitude and longitude values, determining a first pole on the map for consideration for installing a network element for providing wireless services, presenting a geographic boundary on the map relative to the first pole, the geographic boundary encompassing candidate poles, and selecting, from the candidate poles within the geographic boundary, a pole to install the network element to provide the wireless services provides at least the advantages of providing a pole data manager that presents, on a graphical user interface, a map of pole data combined from a plurality of sources, such as utility companies, that helps developers and end-users fetch data of pole sites and select poles for installing network elements using longitude and latitude. Site location is viewed on a map according to latitude and longitude. The pole data manager is used for integration purposes for creating candidate sites for installing network elements (NEs) that provide wireless telecommunication services. The pole data manager provides an interface to pole data from different sources thereby saving development time and providing more flexibility to developers.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for providing pole management for installation of network elements, comprising:
   obtaining pole data having latitude values and longitude values from a plurality of sources, wherein each of the plurality of sources is associated with at least one of a plurality of service providers;
   presenting, on a map in a graphical user interface, one or more poles associated with at least a portion of the pole data based at least on the latitude values and the longitude values, wherein each of the one or more poles is associated with a same service provider or a different service provider of the plurality of service providers;
   determining a first pole of the one or more poles on the map for consideration for installing a network element for providing wireless services;
   presenting a geographic boundary on the map relative to the first pole, the geographic boundary encompassing one or more candidate poles; and
   selecting, from the one or more candidate poles within the geographic boundary, a nominal pole to install the network element to provide the wireless services.

2. The method of claim 1, wherein the obtaining the pole data from the plurality of sources further includes:
   obtaining unstructured pole data from the plurality of sources;
   structuring the unstructured pole data from the plurality of sources according to a data model to generate structured data;
   merging the structured data; and
   storing the structured data into a central pole database.

3. The method of claim 1, wherein the presenting the geographic boundary includes presenting a circle having a predetermined radius centered on the first pole.

4. The method of claim 3, wherein the presenting the circle having the predetermined radius includes:

determining a technology associated with the network element to be installed to provide the wireless services; and determining the radius based on the technology associated with the network element to be installed.

5. The method of claim 1, wherein the selecting, from the one or more candidate poles within the geographic boundary, the nominal pole to install the network element to provide the wireless services includes:

determining the first pole has an issue unconducive for providing the wireless services;

choosing an alternative pole from the one or more candidate poles within the geographic boundary;

determining the alternative pole is acceptable for providing the wireless services; and selecting the alternative pole as the nominal pole.

6. The method of claim 5, wherein the determining the first pole has the issue unconducive for providing the wireless services includes:

determining at least one of: the first pole is not associated with a location for providing the wireless services, the first pole is located between structures attenuating signals for providing the wireless services, or the first pole experiences electromagnetic interference.

7. The method of claim 1, wherein the presenting, on the map in the graphical user interface, the one or more poles associated with at least a portion of the pole data based at least on the latitude values and the longitude values includes:

identifying one of the one or more poles as the first pole;

identifying the one or more candidate poles within the geographic boundary; and identifying one or more second poles of the one or more poles outside the geographic boundary as not being considered for installing the network element for providing the wireless services.

8. A device for providing pole management for installation of network elements comprising:

a memory storing computer-readable instructions; and a processor connected to the memory, wherein the processor is configured to execute the computer-readable instructions to:

obtain pole data having latitude values and longitude values from a plurality of sources, wherein each of the plurality of sources is associated with at least one of a plurality of service providers;

present, on a map in a graphical user interface, one or more poles associated with at least a portion of the pole data based at least on the latitude values and the longitude values, wherein each of the one or more poles is associated with a same service provider or a different service provider of the plurality of service providers;

determine a first pole of the one or more poles on the map for consideration for installing a network element for providing wireless services;

present a geographic boundary on the map relative to the first pole, the geographic boundary encompassing one or more candidate poles; and select, from the one or more candidate poles within the geographic boundary, a nominal pole to install the network element to provide the wireless services.

9. The device of claim 8, wherein the processor is further configured for obtaining the pole data from the plurality of sources by:

obtaining unstructured pole data from the plurality of sources;

structuring the unstructured pole data from the plurality of sources according to a data model to generate structured data;

merging the structured data; and storing the structured data into a central pole database.

10. The device of claim 8, wherein the processor is further configured to present the geographic boundary by presenting a circle having a predetermined radius centered on the first pole.

11. The device of claim 10, wherein the processor is further configured to present the circle having the predetermined radius centered on the first pole by:

determining a technology associated with the network element to be installed to provide the wireless services; and determining the radius based on the technology associated with the network element to be installed.

12. The device of claim 8, wherein the processor is further configured to select, from the one or more candidate poles within the geographic boundary, the nominal pole to install the network element to provide the wireless services by:

determining the first pole has an issue unconducive for providing the wireless services;

choosing an alternative nominal pole from the one or more candidate poles within the geographic boundary;

determining the alternative nominal pole is acceptable for providing the wireless services; and selecting the alternative pole as the nominal pole.

13. The device of claim 12, wherein the processor is further configured to determine the selected first pole has the issue unconducive for providing the wireless services by determining at least one of: the first pole is not associated with a location for providing the wireless services, the first pole is located between structures attenuating signals for providing the wireless services, or the first pole experiences electromagnetic interference.

14. The device of claim 8, wherein the processor is further configured to present, on the map in the graphical user interface, the one or more poles associated with at least a portion of the pole data based at least on the latitude values and the longitude values by:

identifying one of the one or more poles as the first pole;

identifying the one or more candidate poles within the geographic boundary; and identifying one or more second poles of the one or more poles outside the geographic boundary as not being considered for installing the network element for providing the wireless services.

15. A non-transitory computer-readable media having computer-readable instructions stored thereon, which when executed by a processor causes the processor to perform operations comprising:

obtaining pole data having latitude values and longitude values from a plurality of sources, wherein each of the plurality of sources is associated with at least one of a plurality of service providers;

presenting, on a map in a graphical user interface, one or more poles associated with at least a portion of the pole data based at least on the latitude values and the longitude values, wherein each of the one or more poles is associated with a same service provider or a different service provider of the plurality of service providers;

determining a first pole of the one or more poles on the map for consideration for installing a network element for providing wireless services;

presenting a geographic boundary on the map relative to the first pole, the geographic boundary encompassing one or more candidate poles; and selecting, from the one or more candidate poles within the geographic boundary, a nominal pole to install the network element to provide the wireless services.

16. The non-transitory computer-readable media of claim 15, wherein the obtaining the pole data from the plurality of sources further includes:

obtaining unstructured pole data from the plurality of sources;

structuring the unstructured pole data from the plurality of sources according to a data model to generate structured data;

merging the structured data; and storing the structured data into a central pole database.

17. The non-transitory computer-readable media of claim 15, wherein the presenting the geographic boundary includes presenting a circle having a predetermined radius centered on the first pole.

18. The non-transitory computer-readable media of claim 17, wherein the presenting the circle having the predetermined radius includes:

determining a technology associated with the network element to be installed to provide the wireless services; and determining the radius based on the technology associated with the network element to be installed.

19. The non-transitory computer-readable media of claim 15, wherein the selecting, from the one or more candidate poles within the geographic boundary, the nominal pole to install the network element to provide the wireless services includes:

determining the first pole has an issue unconducive for providing the wireless services;

choosing an alternative pole from the one or more candidate poles within the geographic boundary;

determining the alternative pole is acceptable for providing the wireless services; and selecting the alternative pole as the nominal pole.

20. The non-transitory computer-readable media of claim 15, wherein the presenting, on the map in the graphical user interface, the one or more poles associated with at least a portion of the pole data based at least on the latitude values and the longitude values includes:

identifying one of the one or more poles as the first pole;

identifying the one or more candidate poles within the geographic boundary; and identifying one or more second poles of the one or more poles outside the geographic boundary as not being considered for installing the network element for providing the wireless services.

* * * * *